Patented Sept. 15, 1931

1,822,982

UNITED STATES PATENT OFFICE

GEORG RÖSCH, OF COLOGNE-MULHEIM, AND WILHELM BAUER, OF WIESDORF, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

HALOGENATED NAPHTHALENE

No Drawing. Application filed October 21, 1929, Serial No. 401,361, and in Germany October 24, 1928.

The present invention relates to halogenated naphthalenes and to a process of preparing same.

In accordance with the present invention 1-chloronaphthalenes which are further substituted in exactly defined positions by chloro or bromo atoms and which may contain a sulfonic acid group in the 8-position, can be prepared in good yield and in a convenient manner as follows:

We start with 1-chloro-naphthalene-8-sulfonic acid or a water-soluble salt thereof dissolved or suspended in water and react upon this solution or suspension with chlorine or bromine. At lower temperatures, that is, between about 0 to 50° C., and especially when causing the halogen to enter the reaction mixture slowly, the 1.4-dichloro- respectively 1-chloro-4-bromo-naphthalene-8-sulfonic acids (in the latter case besides the 1-chloro-8-bromo-naphthalene) are obtained, which can be isolated by salting out and which on further treatment with chlorine or bromine in aqueous solution or suspension, especially at temperatures above about 50° C., are transformed into halogenated naphthalenes of various kind as per the following scheme:

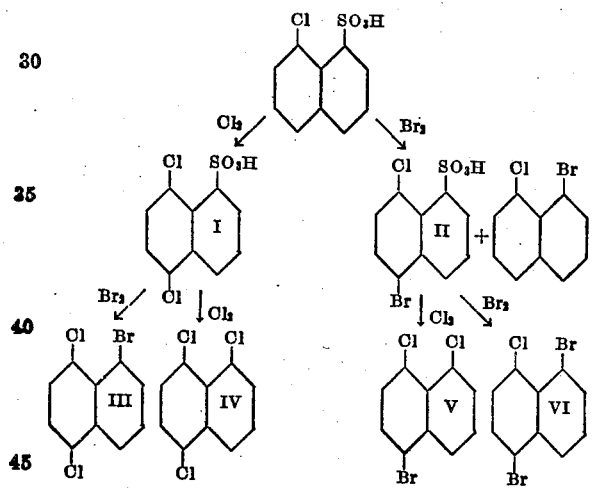

Obviously the products of the formulas marked III–VI can also be obtained without isolating the intermediate products I and II either by reacting upon the starting material with a large excess of chlorine or bromine and under more energetic conditions (i. e. by more rapidly introducing the halogen and/or at a temperature above about 50° C.), whereby the products marked IV and VI are obtained, or by interrupting the first reaction after formation of the products I or II and using the aqueous solutions thus obtainable directly for the production of the compounds III and V as described above.

It may be mentioned that the temperature ranges given are not to be understood as exactly limiting the possibilities of formation of the single compounds, but, for instance, the formation of compounds I and II can also be performed at somewhat higher temperatures than 50° C. while simultaneously lowering the amount of the halogen and the speed of introducing it into the reaction mixture and, vice versa, the higher halogenated compounds may also be prepared at lower temperatures than 50° C. while simultaneously raising the amount of halogen or the speed of its introduction.

The products thus obtainable form colorless well crystallizing needles or leaflets, soluble in glacial acetic acid and other organic solvents, except those which contain sulfonic acid groups, which latter compounds are soluble in water and yield well crystallized alkali metal salts.

The following examples illustrate our invention without limiting it thereto:

*Example 1. Sodium salt of 1:4-dichloronaphthalene-8-sulfonic acid.*—264.5 parts by weight of the sodium salt of 1-chloro-naphthalene-8-sulfonic acid are dissolved in 1000 parts of water and acidified to Congo red by means of hydrochloric acid. 71 parts by weight of chlorine are then passed in within about 3–4 hours while stirring at about 25° C. The 1:4-dichloronaphthalene-8-sulfonic acid, which separates, is filtered with suction and dissolved in water by means of sodium carbonate. The solution is then filtered, salted out with sodium chloride, filtered and dried. The sodium salt thus obtainable forms beautiful colorless leaflets.

*Example 2. 1:4:8-trichloronaphthalene.*— 264.5 parts by weight of the sodium salt of 1-chloronaphthalene-8-sulfonic acid are dissolved in 1000 parts by weight of water and advantageously acidified to Congo red by means of hydrochloric acid. 142 parts by weight of chlorine are then passed in with stirring at about 90–100° C. The 1:4:8-trichloronaphthalene, which separates, is filtered with suction and washed with water. After crystallizing from glacial acetic acid, the trichloronaphthalene shows the melting point 130° C.

Example 3. *1 : 4 - dichloronaphthalene.*—1:4-dichloronaphthalene-8-sulfonic acid, obtainable as described in Example 1, is heated to boiling in approximately 50% sulfuric acid under a reflux condenser until the sulfonic acid group has been split off. The 1:4-dichloronaphthalene then separates in the form of white needles in the condenser. After crystallization from glacial acetic acid, the 1:4-dichloronaphthalene melts at 71–72° C. Its formation in this manner yields proof as to the constitution of the 1:4-dichloronaphthalene-8-sulfonic acid of Example 1.

Example 4. *1 : 4-dichloro-8-bromonaphthalene.*—293 parts by weight of the sodium salt of 1:4-dichloronaphthalene-8-sulfonic acid are dissolved in 3000 parts by weight of water and acidified to Congo red by means of hydrochloric acid. 160 parts by weight of bromine are added with stirring at about 60° C. A crystalline precipitate of 1:4-dichloro-8-bromonaphthalene soon separates, which, as soon as all the bromine has been consumed and after cooling, is filtered and washed with water. On crystallizing from glacial acetic acid beautiful colorless needles are obtained, melting at 112–113° C.

Example 5. *1:8-chlorobromonaphthalene.*—264.5 parts by weight of the sodium salt of 1-chloronaphthalene-8-sulfonic acid are dissolved in 1000 parts by weight of water and acidfied to Congo red by means of hydrochloric acid. 160 parts by weight of bromine are then added within about 1 to 2 hours while stirring at room temperature. A crystalline precipitate of 1:8-chloro-bromonaphthalene soon separates, which, as soon as all the bromine has been consumed, is filtered and washed with water. On crystallizing from glacial acetic acid beautiful colorless needles are obtained, melting at 87–88° C.

Example 6. *Sodium salt of 1-chloro-4-bromonaphthalene-8-sulfonic acid.*—The filtrate from Example 5 is rendered alkaline with caustic soda and the sodium salt of the 1-chloro-4-bromo-naphthalene-8-sulfonic acid is salted out by means of sodium chloride and filtered. It is purified by dissolving in hot water, boiling with animal charcoal, filtering and precipitating the sodium salt in small leaflets by means of sodium chloride.

Example 7. *1-chloro-4-bromonaphthalene.*— 1-chloro-4-bromonaphthalene-8-sulfonic acid (obtainable according to Example 6) is heated to boiling under a reflux condenser with approximately 50% sulfuric acid until the sulfonic acid group has been split off. After cooling the new product is filtered and washed with water. When crystalized from glacial acetic acid the 1-chloro-4-bromonaphthalene melts at 66–67° C. Its formation in this manner yields proof as to the constitution of the product of Example 6.

Example 8. *1-chloro-4:8-dibromonaphthalene.*—343.5 parts by weight of the sodium salt of 1-chloro-4-bromonaphthalene-8-sulfonic acid are dissolved in 4000 parts by weight of water and acidified to Congo red by means of hydrochloric acid. 160 parts by weight of bromine are then added with stirring at about 20° C. A crystalline precipitate of 1-chloro-4:8-dibromonaphthalene soon separates, which, as soon as all the bromine has been used up, is filtered by suction and washed with water. On crystallization from glacial acetic acid beautiful colorless needles are obtained melting at 96–97° C.

Example 9. *1:8-dichloro-4-bromonaphthalene.*—343.5 parts by weight of the sodium salt of 1-chloro-4-bromonapthalene-8-sulfonic acid are dissolved in 4000 parts by weight of water and acidified to Congo red by means of hydrochloric acid. 71 parts by weight of chlorine are then passed in with stirring at about 50° C. The 1:8-dichloro-4-bromonaphthalene which separates is filtered and washed with water. After crystallization from glacial acetic acid, the new substance melts at 114–115° C.

We claim:

1. Process which comprises reacting upon 1-chloronaphthalene-8-sulfonic acid with a halogen of the group consisting of chlorine and bromine in the presence of water.

2. Process which comprises reacting upon 1-chlornaphthalene-8-sulfonic acid with a halogen of the group consisting of chlorine and bromine in aqueous solution and at a temperature between about 0 and 100° C.

3. The new halogenated naphthalene compounds of the probable general formula:

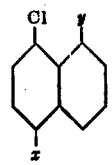

wherein $x$ represents a substituent of the group consisting of chlorine and bromine and $y$ means a substituent of the group consisting of chlorine bromine and the sulfonic acid group, but $x$ and $y$ not standing simultaneously for chlorine, said compounds forming colorless crystals.

4. The new halogenated naphthalene compounds of the probable general formula:

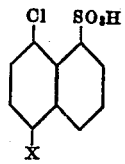

wherein X represents a substituent of the group consisting of chlorine and bromine, said compounds forming colorless crystals.

5. The new halogenated naphthalene compounds of the probable general formula:

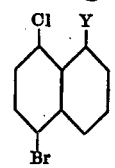

wherein Y represents a substituent of the group consisting of chlorine and bromine, said compounds forming colorless crystals.

In testimony whereof, we affix our signatures.

GEORG RÖSCH.
WILHELM BAUER.